United States Patent
Xie (10) Patent No.: US 9,032,082 B2
(45) Date of Patent: May 12, 2015

(54) METHOD AND DEVICE CONFIGURED FOR PROCESSING AN SDP REQUEST IN A MEDIA PATH OPTIMIZATION PROCESS

(75) Inventor: Zhenhua Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 213 days.

(21) Appl. No.: 13/259,738

(22) PCT Filed: Dec. 24, 2010

(86) PCT No.: PCT/CN2010/080225
§ 371 (c)(1),
(2), (4) Date: Aug. 13, 2012

(87) PCT Pub. No.: WO2011/097926
PCT Pub. Date: Aug. 18, 2011

(65) Prior Publication Data
US 2012/0303825 A1    Nov. 29, 2012

(30) Foreign Application Priority Data

Feb. 12, 2010  (CN) .......................... 2010 1 0120055

(51) Int. Cl.
*G06F 15/16*    (2006.01)
*H04L 29/12*    (2006.01)
*H04L 29/06*    (2006.01)

(52) U.S. Cl.
CPC ........... *H04L 29/12009* (2013.01); *H04L 63/02* (2013.01); *H04L 65/1069* (2013.01); *H04L 61/2546* (2013.01); *H04L 65/103* (2013.01)

(58) Field of Classification Search
CPC ........................ H04L 65/1006; H04W 80/10
USPC .................... 709/227, 228, 238, 239, 241
See application file for complete search history.

(56) References Cited

U.S. PATENT DOCUMENTS

| | | | |
|---|---|---|---|
| 8,520,687 B2* | 8/2013 | Ejzak | 370/401 |
| 2007/0253418 A1 | 11/2007 | Shiri et al. | |
| 2009/0010270 A1* | 1/2009 | Ejzak | 370/401 |
| 2009/0041034 A1* | 2/2009 | Boucadair et al. | 370/400 |
| 2010/0098093 A1* | 4/2010 | Ejzak | 370/401 |
| 2011/0032930 A1* | 2/2011 | Belling | 370/352 |

FOREIGN PATENT DOCUMENTS

| | | |
|---|---|---|
| CN | 1902889 A | 1/2007 |
| CN | 101110790 A | 1/2008 |
| WO | WO-2009/008978 A2 | 1/2009 |

* cited by examiner

*Primary Examiner* — Mohamed Wasel
(74) *Attorney, Agent, or Firm* — Venable LLP; Robert Kinberg (57) ABSTRACT

A method and device configured for processing a session description protocol SDP request in a media path optimization process are provided. The method comprises: an application layer gateway (ALG) receiving a SDP request; the ALG determining that media connection information used by the SDP request is different from media connection information in last accessible domain information in node information of the SDP request; and the ALG sequentially adding its forward accessible domain information and its backward accessible domain information to an end of a queue of the node information of the SDP request, and then sending the SDP request. Thus, an optimized media path and normal communication can be ensured.

18 Claims, 7 Drawing Sheets

ALG receives an SDP request

S302

ALG determines that the media connection information used by this SDP request is different from the media connection information in the last accessible domain information in the SDP request

S304

ALG sequentially adds its node information into the tail of the queue of the node information in the SDP request, and then sends this SDP request

METHOD AND DEVICE CONFIGURED FOR PROCESSING AN SDP REQUEST IN A MEDIA PATH OPTIMIZATION PROCESS

This application is a national stage of International Application No. PCT/CN2010/080225, filed Dec. 24, 2010, claiming priority to Chinese Application No. 201010120055.8, filed Feb. 12, 2010.

FIELD OF THE INVENTION

The present invention relates to the communication field and in particular to a method and device configured for processing an SDP request in a media path optimization process.

BACKGROUND OF THE INVENTION

The IP multimedia subsystem (abbreviated as IMS) is an IP-based network architecture proposed by the 3rd Generation Partnership Project (abbreviated as 3GPP), which system constructs an open and flexible service environment, supports multimedia applications, and can provide abundant multimedia services for users.

Figure 1A:
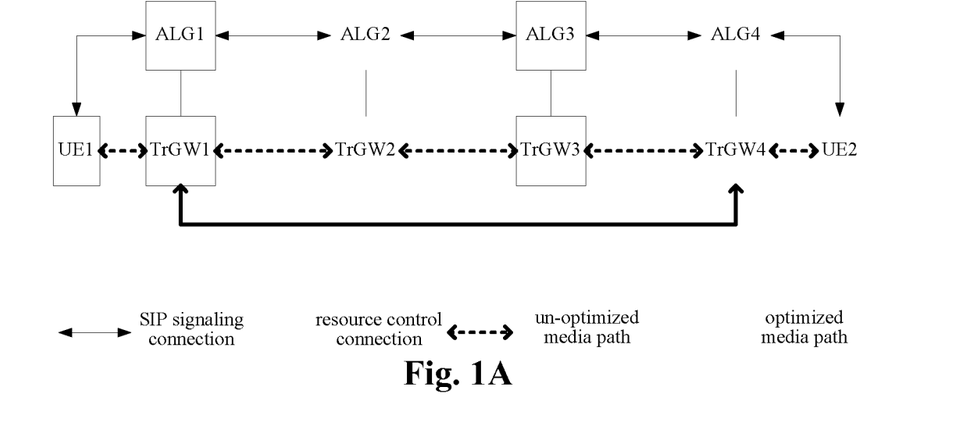
FIG. 1A is a schematic diagram of the IMS media path optimization in relevant art.

FIG. 1A is a schematic diagram of the IMS media path optimization in relevant art, which describes different media paths between an IMS calling terminal UE1 and an IMS called terminal UE2 as well as corresponding signaling paths. As shown in FIG. 1A, the media path established by the currently available call process is: UE1, transmit gateway (abbreviated as TrGW) 1, TrGW2, TrGW3, TrGW4, UE2, while the optimized media path is: UE1, TrGW1, TrGW4, UE2, so the optimized media path is shorter than the unoptimized media path, with two TrGWs reduced, therefore the optimized media path saves resources and also improves efficiency. In this case, the signaling gateway application layer gateway (abbreviated as ALG) 1 controls TrGW1, ALG2 controls TrGW2, ALG3 controls TrGW3, and ALG4 controls TrGW4.

Figure 1B:
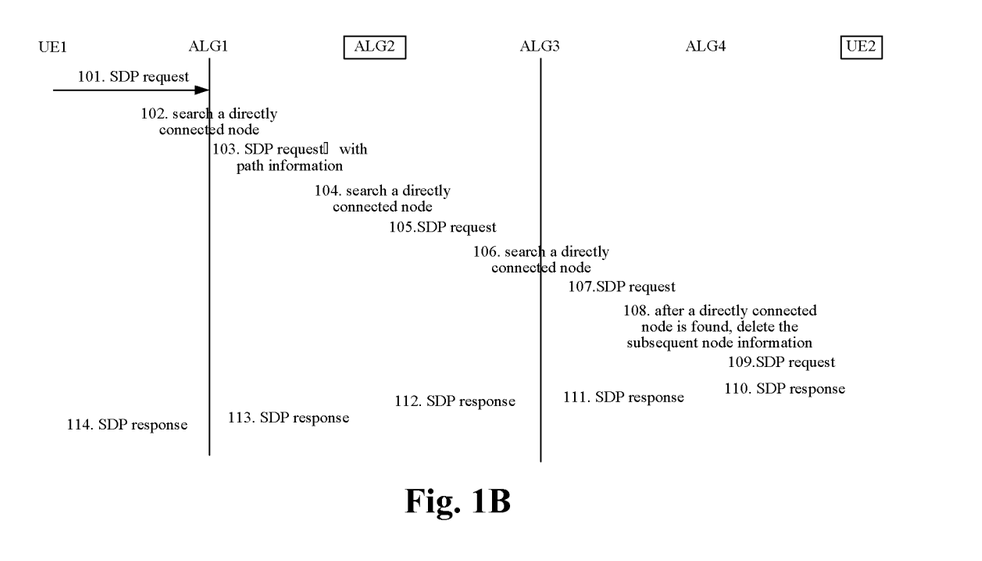
FIG. 1B is a flow chart of the IMS media path optimization in relevant art.

FIG. 1B is a flow chart of the IMS media path optimization in relevant art, which corresponds to the schematic diagram of FIG. 1A and mainly comprises the following steps:

Step 101: UE1 sends a session description protocol (abbreviated as SDP) request to UE2 to negotiate the media resource information, for example, by sending a call signaling of SIP (i.e. an INVITE request), the message body of the session initiation protocol (abbreviated as SIP) request including this SDP request, and the content of the SDP request is the media resource information of UE1;

Steps 102 to 103: The SDP request arrives at signaling gateway ALG1, and the signaling gateway ALG1 selects TrGW1 as a media gateway; ALG1 first checks whether there is a node which can be directly linked thereto in the node information recorded in the SDP request, and there is no such node in this example, then it controls this media gateway to use the media resource information in the SDP request and allocates the media resource for backward connection; ALG1 replaces the media resource information in the SDP request with the media resource information for backward connection of TrGW1, and then forwards the SDP request after adding the node information controlled by ALG1 into this SDP request, which node information contains the forward accessible domain information of TrGW1, which includes the connection information, domain name information, etc. of the corresponding media (i.e. the media connection information of UE1) in the SDP; and the SDP request can be forwarded by way of, for example, being included in an SIP signaling;

Steps 104 to 105: The SDP request arrives at signaling gateway ALG2, and ALG2 selects TrGW2 as a media gateway; ALG2 first checks whether there is a node which can be directly linked thereto in the node information recorded in the SDP request, and there is no such node in this example, then it controls this media gateway to use the media resource information in the SDP request and allocates the media resource for backward connection; ALG2 replaces the media resource information in the SDP request with the media resource information for backward connection of TrGW2 and then forwards the SDP request after adding the node information controlled by ALG2 into the SDP request, which node information contains the forward accessible domain information of TrGW2, which includes the connection information, domain name information, etc. of the corresponding media (i.e. the backward media connection information of TrGW1) in the SDP; The SDP request can be forwarded by way of, for example, being included in an SIP signaling;

Steps 106 to 107: The SDP request arrives at signaling gateway ALG3, and ALG3 selects TrGW3 as a media gateway; ALG3 first checks whether there is a node which can be directly linked thereto in the node information recorded in the SDP request, and there is no such node in this example, then it controls this media gateway to use the media resource information in the SDP request and allocates the media resource for backward connection; ALG3 replaces the media resource information in the SDP request with the media resource information for backward connection of TrGW3 and then forwards the SDP request after adding the node information controlled by ALG3 into the SDP request, which node information contains the forward accessible domain information of TrGW1, which includes the connection information, domain name information, etc. of the corresponding media (i.e. the backward media connection information of TrGW2) in the SDP; and the SDP request can be forwarded by way of, for example, being included in an SIP signaling;

Steps 108 to 109: The SDP request arrives at signaling gateway ALG4, and ALG4 selects TrGW3 as a media gateway; ALG4 first checks whether there is a node which can be directly linked thereto in the node information recorded in the SDP request, and in this example, the forward of TrGW4 can be directly backward-linked to TrGW1 (the backward connection information and domain name information of TrGW1 are provide by ALG2, and ALG4 checks there is a node which can be directly linked thereto in the front according to the domain name), then it controls this media gateway to use the media resource information provided by the node information which is found in the SDP request, i.e. the backward media connection information of TrGW1, and allocates the media resource for backward connection of TrGW4; ALG4 replaces the media resource information in the SDP request with the media resource information for backward connection of TrGW4, then ALG4 deletes the node information after the node which is found, and then forwards the SDP request, for example, by way of including it in an SIP signaling;

Step 110: The SDP request arrives at UE2, and UE2 uses the media resource information in the SDP request and sends an SDP response including the media resource information of UE2, for example, by a "200 OK" reply of an SIP signaling, the message body of this SIP reply including the SDPP response, and this SDP response arrives at ALG4;

Step 111: ALG4 checks whether there is there is node information of itself in the response, and in this example, there is no node information in this step, since ALG4 has found an optimized path, thus the node information is included in the SDP response, which information includes the media connection address information for forward connection of TrGW4 and the sequence number of the node which can be directly linked thereto (in this example, the sequence number is 2, i.e. the second node—which can be directly linked to TrGW1, and the first node in this example is UE1); and ALG4 replaces the media resource information in the SDP response with the media resource information for forward connection of TrGW4 and then forwards the SDP response, which SDP response arrives at ALG3;

Step 112: ALG3 checks whether there is there is node information of itself in the response, and in this example, there is no node information relative to itself in this step (which is determined according to the sequence number), however, since the node information is included in the SDP response, TrGW3 can be bypassed, thus the resource of TrGW3 is released and the SDP response is forwarded, which SDP response arrives at ALG2;

Step 113: ALG2 checks whether there is node information of itself in the response, and in this example, there is no node information relative to itself in this step (which is determined according to the sequence number, and the sequence number being 2 indicates that the node information is added by ALG2), then ALG2 replaces the connection information of the corresponding media in the SDP response with the connection information (i.e. the forward media connection information of TrGW4) in the node information and forwards the SDP response after deleting the node information in the SDP response; and since the node information is included in the received SDP response, TrGW2 can be bypassed, thus ALG2 releases the resource of TrGW2, and the SDP response arrives at ALG1; and Step 114: ALG1 checks whether there is node information of itself in the response, and in this example, there is no node information in this step, so it replaces the media resource information in the SDP response with the media resource information for forward connection of TrGW1, and then forwards the SDP response, which SDP response arrives at ALG3; till now, an optimized media path is established, which media path is: UE1, TrGW1, TrGW4, and UE2.

In the above media path optimization procedure, since only the forward media connection information of each ALG is recorded in the node information of the SDP request, the ALG which receives the SDP request is unable to determine whether an ALG which does not support optimization algorithm is included in the path passed by the SDP request and regards all the ALGs as the ALGs which support optimization algorithm, so that it is possible to get a wrong optimized media path and even cause the failure of subsequent communication when there is an ALG which does not support optimization algorithm in the path. For example, in the above procedure, if ALG3 is un-enhanced (i.e. it does not support optimization algorithm), then it does not modify the node information in the SDP request when receiving the SDP request but forwards it directly; in step 108, ALG4 can find a directly connected node TrGW1 according to the node information in the SDP request and uses the media connection information of TrGW1, therefore the above optimized media path can be finally established; while in step 112, ALG3 will establish the media connection between TrGW3 and TrGW4 as well as TrGW2 according to normal steps, but does not release the resource of TrGW3, thus causing the optimized media path which is finally established to be wrong.

Figure 1C:
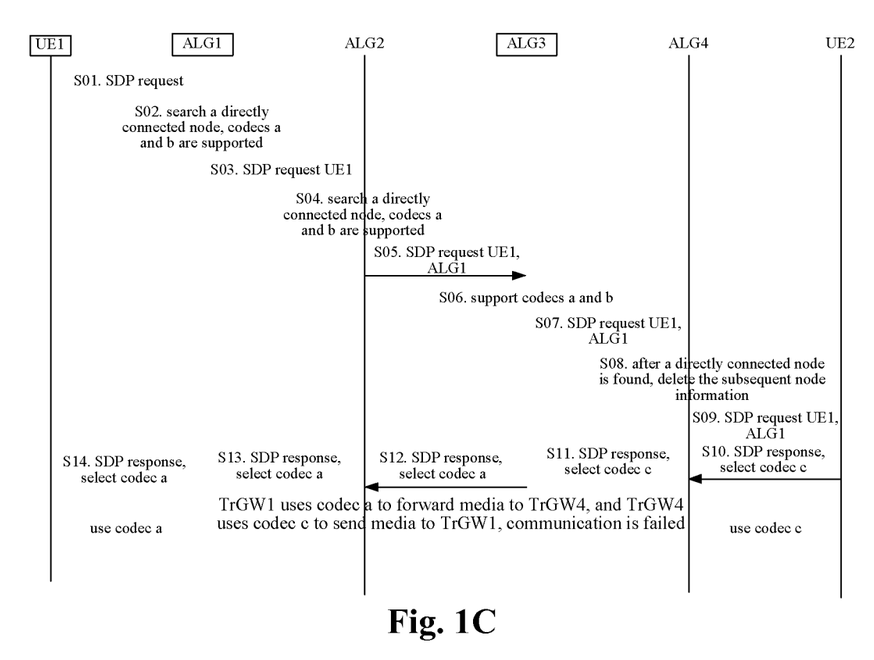
FIG. 1C is a schematic diagram of the IMS media path optimization going wrong in relevant art.

Moreover, if ALG3 further provides a new codec and this codec is finally selected by UE2 to use, then it may cause TrGW1 and TrGW4 to use different codecs for communication respectively, thus leading to the failure of subsequent communication. FIG. 1C is a schematic diagram of the flow chart of the IMS media path optimization going wrong in relevant art, which corresponds to the flow chart in FIG. 1B; it is assumed that ALG1 supports codecs a and b, ALG3 adds codec c, UE2 selects codec c, ALG4 also selects to use codec c, and ALG3 notices that the forward only supports codecs a and b, so it selects to carry out format conversion between codecs c and a and informs the forward to use codec a, and ALG1 will finally select to use codec a. Therefore, UE1 uses codec a to send media to TrGW1 which is controlled by ALG1, TrGW1 forwards media to TrGW4, and TrGW4 forwards media to UE2, however, UE2 selects to use codec c to receive media, which results in that it is unable to perform decoding; in contrast, UE2 uses codec c to send media to TrGW4 which is controlled by ALG4, TrGW4 forwards media to TrGW1, and TrGW1 forwards media to UE1, however, UE1 selects to use codec a to receive media, therefore it is unable to carry out decoding, thereby causing communication failure.

It can be seen from this that in relevant art since it is unable to determine whether an ALG which does not support optimization algorithm is contained in a path of the SDP request during the process of media path optimization, thus it causes the finally obtained optimized media path to be wrong and this wrong optimized media path will further cause communication failure.

SUMMARY OF THE INVENTION

The main object of the present invention is to provide a method and device configured for processing an SDP request in a media path optimization process so as to at least solve the above problems.

A method for processing an SDP request in a media path optimization process is provided according to one aspect of the present invention, which method comprises: an application layer gateway (ALG) receiving a session description protocol (SDP) request; the ALG determining that media connection information used by the SDP request is different from media connection information in last accessible domain information in node information of the SDP request; and the ALG sequentially adding its forward accessible domain information and its backward accessible domain information to an end of a queue of the node information of the SDP request, and then sending the SDP request.

An ALG is provided according to another aspect of the present invention, which ALG comprises: a receiving device configured for receiving an SDP request; a determination device configured for determining whether media connection information used by the SDP request is different from media connection information in last accessible domain information recorded by node information of the SDP request; an add device configured for sequentially adding forward accessible domain information of the ALG and backward accessible domain information of the ALG to an end of a queue of the node information of the SDP request in response to a positive result from the determination device, and for adding the backward accessible domain information of the ALG to the end of the queue of the node information of the SDP request in response to a negative result from the determination device; and a sending device configured for sending the SDP request which has been processed by the add device.

By virtue of the present invention, the problems in the prior art are solved by way of both adding the forward accessible domain information and adding the backward accessible domain information to the SDP request such that the ALG which receives the SDP request can determine whether there is an ALG which does not support optimization algorithm by checking whether the media connection information used by this SDP request is the same as the media connection information in the last accessible domain information in the node information in the SDP request and then carry out a corresponding process according to the determination result, which ensures the optimized media path and normal communication and is easy to achieve.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF THE EMBODIMENTS

The present invention is described in detail with reference to the accompanying drawings in combination with the embodiments hereinafter. It should be explained that the embodiments of the present invention and the features of the embodiments can be combined with each other if there is no conflict.

An ALG according to the embodiments of the present invention will be described hereinafter.

Figure 2A:
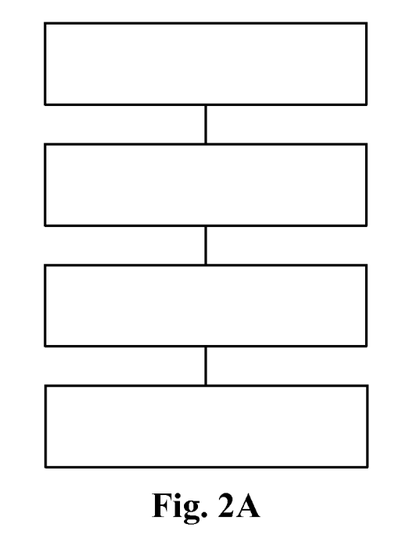
FIG. 2A is a schematic diagram of the structure of an ALG according to the embodiments of the present invention.

FIG. 2A is a schematic diagram of the structure of an ALG according to the embodiments of the present invention, and as shown in FIG. 2, this ALG mainly comprises: a receiving device 10, an add device 20, and a sending device 30. In this case, the receiving device 10 is used for receiving an SDP request; the determination device 40 is used for determining whether media connection information used by the SDP request is different from media connection information in last accessible domain information recorded by node information of the SDP request; the add device 20 is used for sequentially adding forward accessible domain information of the ALG and backward accessible domain information of the ALG to an end of a queue of the node information of the SDP request in response to a positive result from the determination device, and for adding the backward accessible domain information of the ALG to the end of the queue of the node information of the SDP request in response to a negative result from the determination device; and the sending device 30 is used for sending the SDP request which has been processed by the add device.

The above ALG provided in the embodiments of the present invention can add both the forward accessible domain information and the backward accessible domain information to the SDP request, which enables the subsequent signaling gateway to determine whether there is an ALG which does not support optimization algorithm.

Figure 2B:
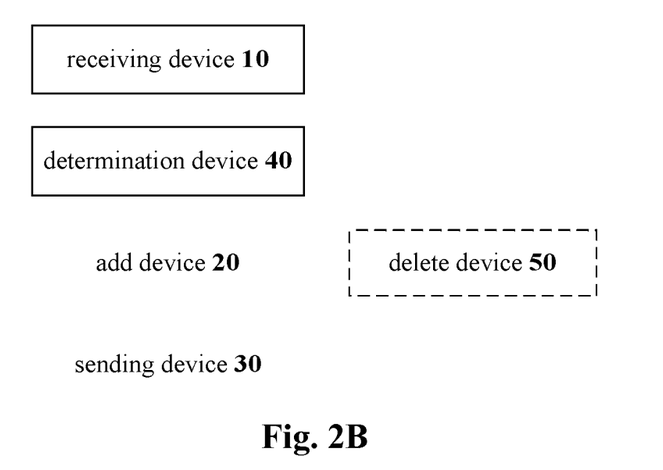
FIG. 2B is a schematic diagram of the structure of an ALG according to the preferred embodiments of the present invention.

When the media connection information used by the SDP request is different from the media connection information of the last accessible domain information recorded in the node information in the embodiments of the present invention, the following two processing solutions can be used in the embodiments of the present invention: one is to delete the accessible domain information recorded in the node information, and the other is to record the codec information in the node information. Therefore, as shown in FIG. 2B, this ALG can further comprise: a delete device 50 for, before the add device adds node information to the node information of the SDP request, deleting all accessible domain information recorded by the node information of the SDP request in response to a positive result from the determination device.

And alternatively, the add device 20 is further used for adding codec information from the SDP request to the forward accessible domain information in response to a positive result from the determination device.

A method for processing media path optimization according to the embodiments of the present invention will be described in the following, which method can be implemented by the ALG shown in above FIG. 2A or FIG. 2B.

Figure 3:
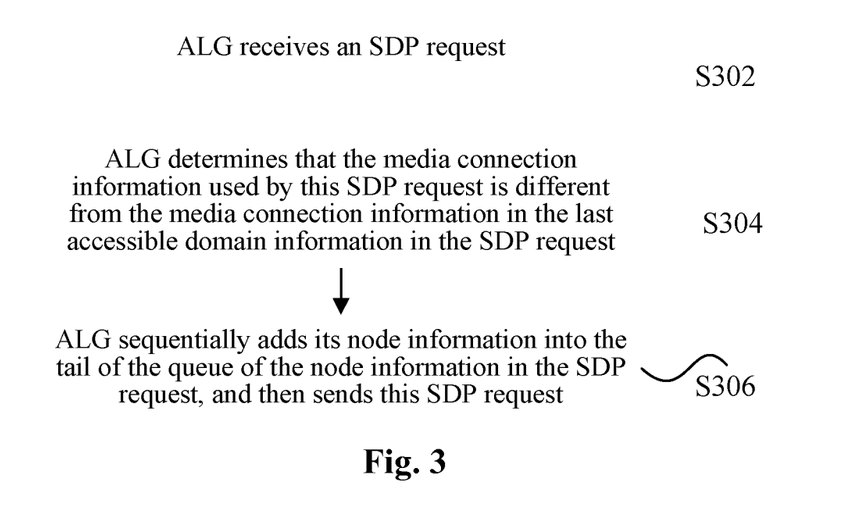
FIG. 3 is a flow chart of a method for processing media path optimization according to the embodiments of the present invention.

FIG. 3 is a flow chart of a method for processing media path optimization according to the embodiments of the present invention, and as shown in FIG. 3, this method mainly comprises the following steps (steps S302 to S306):

Step S302: An ALG receives an SDP request;

Step S304: The ALG determines that the media connection information used by the SDP request is different from the media connection information in the last accessible domain information in the SDP request; and Step S306: The ALG sequentially adds its node information to the end of the queue of the node information of this SDP request and then sends this SDP request, wherein, the node information of this ALG includes: the forward accessible domain information of the ALG and the backward accessible domain information of the ALG.

By virtue of the above method provided in the embodiments of the present invention, when an ALG is sending an SDP request, it can add its forward accessible domain information and its backward accessible domain information to the SDP request, thus enabling a subsequent signaling gateway to determine whether there is an ALG which does not support optimization algorithm.

During the particular implementation, before the ALG forwards the SDP request, it will determine whether there is an ALG which does not support optimization algorithm in the path passed by the SDP according to the node information recorded in the SDP request, perform a corresponding process for optimization processing according to the determination result and then forward the SDP request; and in particular, two modes for processing an SDP request are provided in the embodiments of the present invention, which two modes will be described respectively hereinafter.

Mode I

Figure 4:
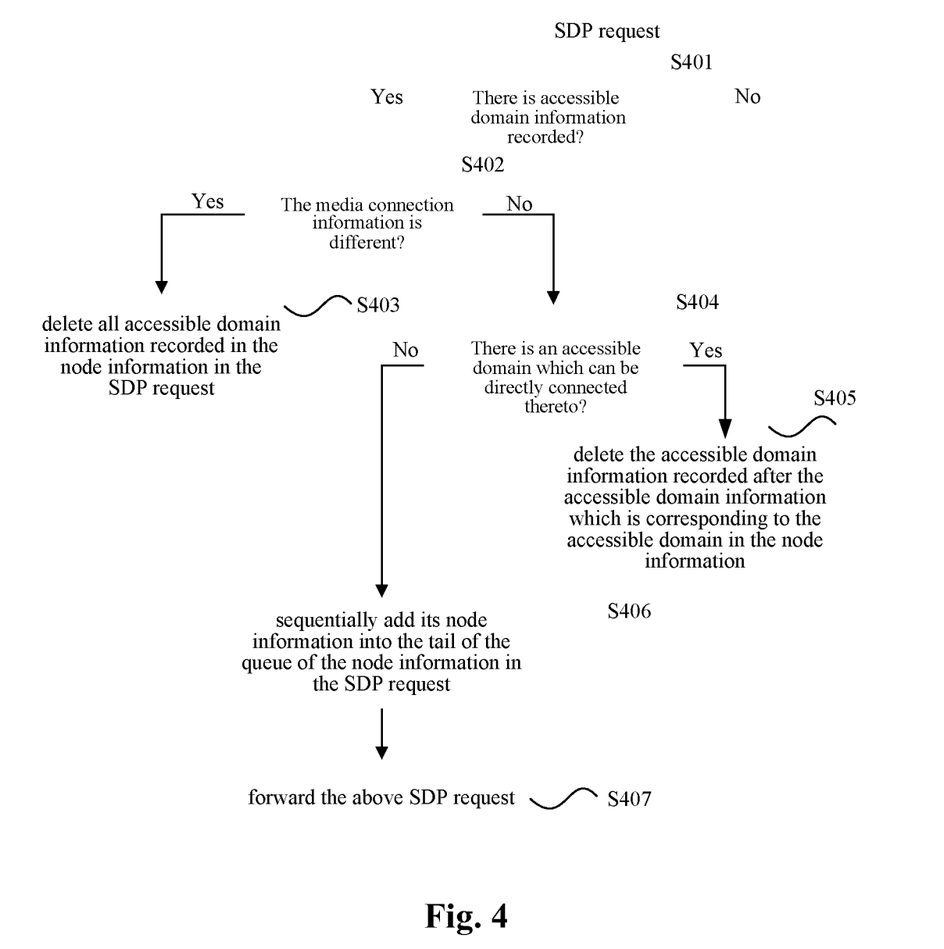
FIG. 4 is a flow chart of a first mode for an ALG to process an SDP request in the embodiments of the present invention.

FIG. 4 is a flow chart of employing mode I, and as shown in FIG. 4, in the mode, after an ALG receives an SDP request, it forwards the SDP request by performing the following steps:

Step S401: The ALG determines whether there is accessible domain information recorded in the node information in the SDP request, if YES, then perform step S402; otherwise, perform step S406;

In the embodiments of the present invention, if there is no accessible domain information recorded in the node information of the SDP request, then it is determined that the media connection information used by the SDP request is different from the media connection information in the last accessible domain information in the node information in the SDP request.

Step S402: The ALG determines whether the media connection information used by the SDP request is different from the media connection information in the last accessible domain information recorded in the node information in the SDP request, if YES, then perform step S403; otherwise, perform step S404;

Since the ALG which does not support optimization algorithm can only forward an SDP request but cannot modify the node information in the SDP request when receiving the SDP request, it can be determined that an ALG which does not support optimization algorithm is contained in the path passed by the SDP request if it is determined that the media connection information used by the SDP request is different from the media connection information in the last accessible domain information recorded in the node information of the SDP request.

Step S403: The ALG deletes all accessible domain information recorded in the node information in the SDP request;

Step S404: The ALG determines whether there is an accessible domain which can be directly linked to a forward accessible domain of the ALG or a backward accessible domain of the ALG in an accessible domain which corresponds to the accessible domain information recorded by the node information, if YES, then perform step S405; otherwise, perform step S406;

During the particular implementation, the forward accessible domain information of the ALG and the backward accessible domain information of the ALG both can include: connection information and domain name information, then the ALG can check whether there is a direct connection according to the domain name information in the accessible domain information recorded in the node information.

Moreover, the forward accessible domain information of the ALG can include the codec information in the SDP request, and can also not include the codec information in the SDP request.

Step S405: The ALG deletes the accessible domain information recorded after the accessible domain information which corresponds to this accessible domain in the node information;

Step S406: The ALG sequentially adds its node information to the end of the queue of the node information in the SDP request;

In this step, if the forward accessible domain information of the ALG is the same as the last accessible domain information recorded by the node information in the SDP request, then the node information which is added to the end of the queue by the ALG only includes the backward accessible domain information of the ALG; otherwise, the node information which is added to the end of the queue by the ALG includes: the forward accessible domain information of the ALG and the backward accessible domain information of the ALG.

Step S407: The ALG forwards the above SDP request.

By virtue of this mode, after determining that there is an ALG which does not support optimization, the ALG deletes the node information prior to this ALG, thus avoiding the problem that this ALG which does not support optimization is bypassed in the media path optimization process and thus results in errors in the optimized media path.

Mode II

Figure 5:
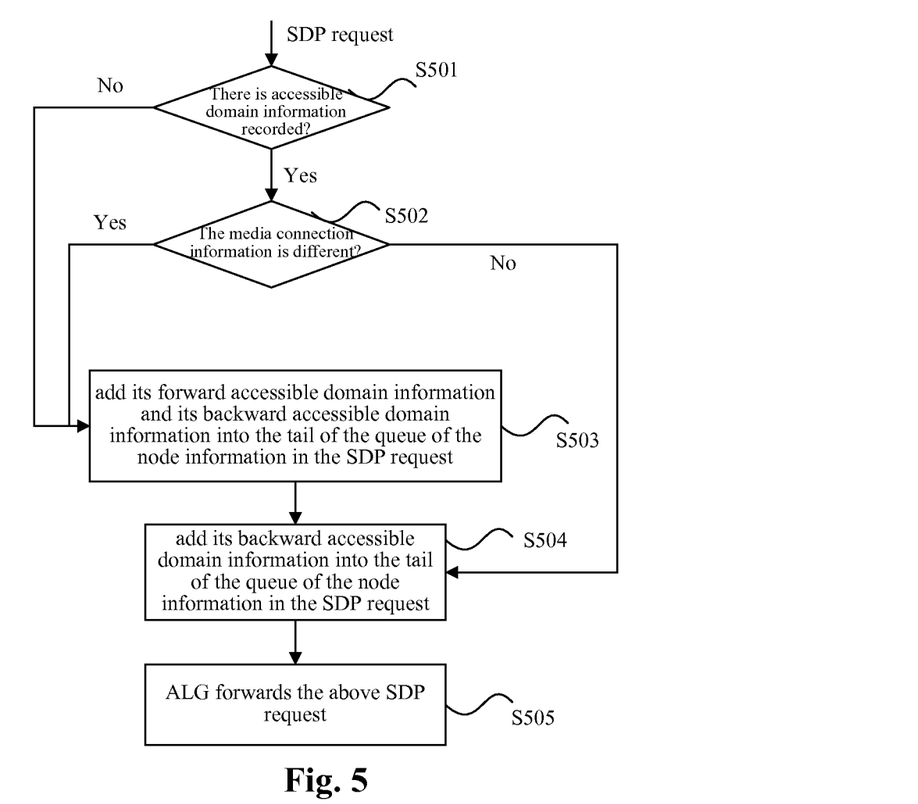
FIG. 5 is a flow chart of a second mode for an ALG to process an SDP request in the embodiments of the present invention.

FIG. 5 is a flow chart of employing mode II, and as shown in FIG. 5, in the mode, after receiving an SDP request, the ALG forwards the SDP request by performing the following steps:

Step S501: The ALG checks whether there is accessible domain information recorded in the node information in the SDP request, if YES, then performs step S502; otherwise, performs step S503;

Step S502: The ALG checks whether the media connection information used by the SDP request is different from the media connection information in the last accessible domain information recorded by the node information which is in the SDP request, if YES, then performs step S503; otherwise, performs step S504;

Step S503: The ALG adds its forward accessible domain information and its backward accessible domain information to the end of the queue of the node information in the SDP request;

Step S504: The ALG adds its backward accessible domain information to the end of the queue of the node information in the SDP request; and Step S505: The ALG forwards the SDP request.

By virtue of this mode, the problem of communication failure caused by inconsistent codecs being used is avoided by recording the codec information in the node information to enable a subsequent ALG to learn the codec information used by the ALG when determining that there is an ALG which does not support optimization algorithm.

In the above second mode, during the process of performing media path optimization when an SDP response is received, in particular, when an ALG receives an SDP response of an SDP request returned by the destination user equipment, the ALG checks whether there is an accessible domain which can be directly linked to the forward accessible domain of the ALG or the backward accessible domain of the ALG in an accessible domain which corresponds to the accessible domain information recorded by the node information of the SDP request, if YES, then the ALG sends an updating message including the media connection information of the accessible domain to the destination user equipment to update this media connection information and includes the direct link information in the SDP response after receiving an updating approval message returned by the destination user equipment, wherein, this direct link information includes: the media resource information in the SDP response and a sequence number of the ALG of the accessible domain information which corresponds to the accessible domain which can be directly linked thereto, and then the ALG forwards the SDP response. Thus, the optimization of the media path is achieved.

Figure 6:
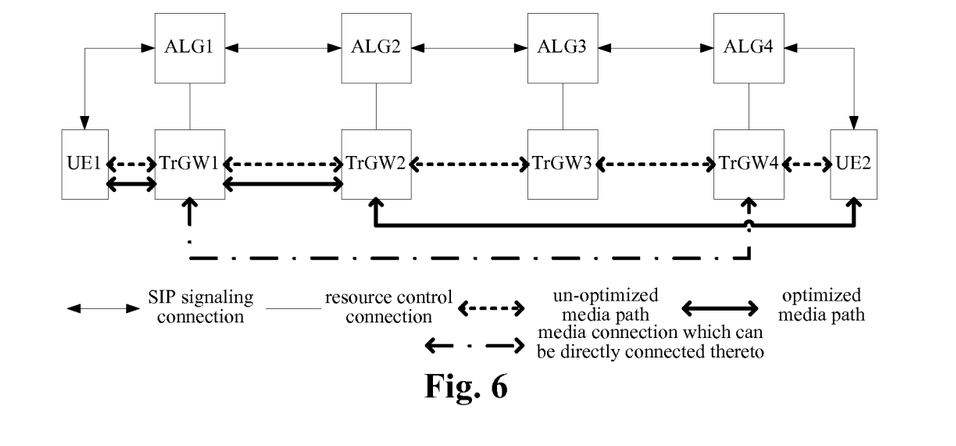
FIG. 6 is a schematic diagram of the IMS media path optimization in the embodiments of the present invention.

Using FIG. 6 as an example, ALG2 does not support optimization algorithm and TrGW2 can be directly backward-linked to the ALG4. Then as shown in FIG. 6, although TrGW1 can be directly linked to TrGW4, ALG2 does not support optimization algorithm, the optimized path obtained according to the technical solution provided in the embodiments of the present invention does not include UE1, TrGW1, TrGW4, UE2. The finally obtained media path is: UE1, TrGW1, TrGW2, and UE2.

The technical solution provided in the embodiments of the present invention will be described in detail with particular embodiments and by using FIG. 6 as an example. In the following embodiments, TrGW1 which is controlled by ALG1 can be directly linked to TrGW4 which is controlled by ALG4, and at the same time, TrGW2 which is controlled by ALG2 also can be directly linked to UE2, and ALG2 does not support optimization algorithm.

Embodiment I

Figure 7:
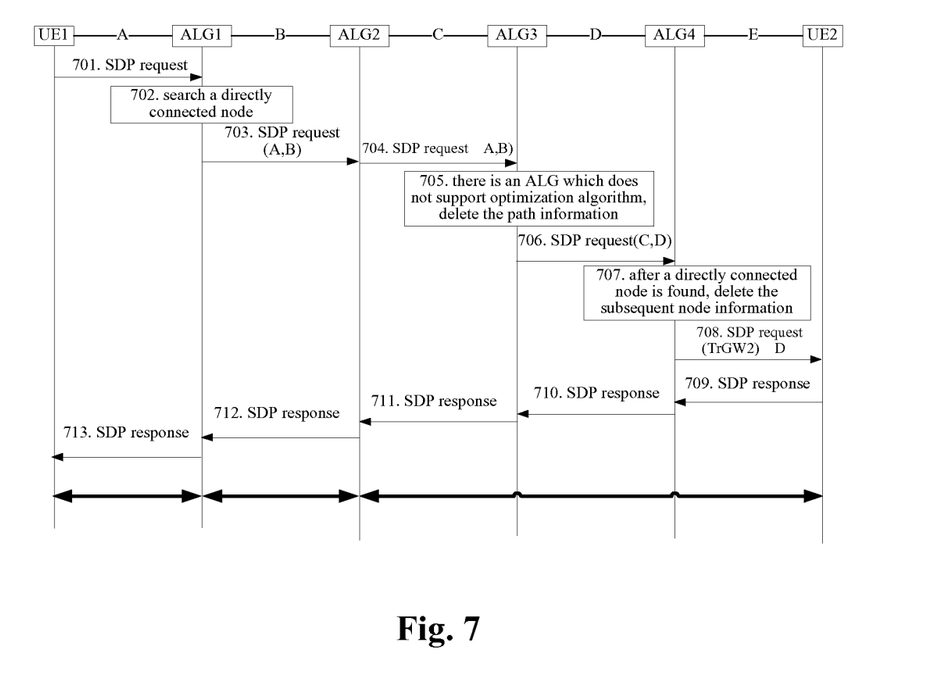
FIG. 7 is a flow chart of embodiment I of the present invention.

FIG. 7 is a flow chart of an embodiment of the present invention corresponding to FIG. 6 and it mainly includes the following steps:

Step 701: UE1 sends an SDP request to UE2 to negotiate the media resource information, for example, by way of sending a call signaling of SIP, i.e. an INVITE request, the message body of this SIP request including this SDP request, and the content of the SDP request is the media resource information of UE1;

Steps 702 to 703: The SDP request arrives at the signaling gateway ALG1, and the signaling gateway ALG1 selects TrGW1 as a media gateway; ALG1 first checks whether the connection information in the last accessible domain in the node information recorded in the SDP request is the same as that in the SDP request, and in this example, there is no node information, then it checks whether there is a node which can be directly linked thereto in the node information recorded in the SDP request; in this example, there is no node information, then it again checks whether the last node information is the forward accessible domain information; in this example, there is no node information, then it controls this media gateway to use the media resource information in the SDP request and allocates the media resource for backward connection; ALG1 replaces the media resource information in the SDP request with the media resource information for backward connection of TrGW1 and then forwards the SDP request after adding the node information controlled by ALG1 to the SDP request, which node information includes the forward accessible domain information and backward accessible domain information of TrGW1, with the forward accessible domain information including the connection information and the domain name information, etc. of the corresponding media (i.e. the media connection information of UE1), in the SDP and the backward accessible domain information including the media connection information, the domain name, etc. of TrGW1; and the SDP request can be forwarded, for example, by way of transferring an SIP signaling which carries the SDP request;

Step 704: The SDP request arrives at the signaling gateway ALG2, and ALG2 does not support optimization algorithm and forwards the SDP request according to a standard process;

Steps 705 to 706: The SDP request arrives at the signaling gateway ALG3, and ALG3 selects TrGW3 as a media gateway; ALG3 first checks whether the connection information in the last accessible domain in the node information recorded in the SDP request is the same as that in the SDP request, and in this example, they are not the same (the connection information in the node information is the connection information of TrGW1, and the connection information in the SDP request is the connection information of TrGW2), then it deletes all node information, controls TrGW3 to use the media resource information in the SDP request, and allocates the media resource to TrGW3 for backward connection; ALG3 replaces the media resource information in the SDP request with the media resource information for backward connection of TrGW3 and forwards the SDP request after adding the node information controlled by ALG3 to the SDP request, which node information includes the forward accessible domain information and backward accessible domain information of TrGW3, with the forward accessible domain information including the connection information, the domain name information, etc. of the corresponding media (i.e. the media connection information of TrGW2) in the SDP and the backward accessible domain information including the media connection information, the domain name, etc. of TrGW3; it then forwards the SDP request, for example, by way of transferring an SIP signaling which carries the SDP request;

Steps 707 to 708: The SDP request arrives at the signaling gateway ALG4, and ALG4 selects TrGW4 as a media gateway; ALG4 first performs a check according to the procedure in step 705, and in this example, the check result is that they are the same, then it checks whether there is a node which can be directly linked thereto in the node information recorded in the SDP request; and in this example, TrGW4 can be directly backward-linked to TrGW2 (the backward connection information and the domain name information of TrGW2 are provided by ALG3, and ALG4 determines that there is a node which can be directly linked thereto in the front according to the domain name), then this media gateway is bypassed; ALG4 replaces the media resource information in the SDP request with the connection information in the node information which is found (i.e. the media resource information for backward connection of TrGW2), then deletes the node information after the node found by ALG4, and forwards the SDP request, for example, by way of transferring an SIP signaling which carries the SDP request;

Step 709: The SDP request arrives at UE2, and UE2 uses the media resource information in the SDP request and sends an SDP response including the media resource information of UE2, for example, by a "200 OK" reply of an SIP signaling, the message body of this SIP reply including the SDP response, and the SDP response arrives at ALG4;

Step 710: ALG4 checks whether there is node information corresponding to ALG4 in the response, and in this example, there is no node information in this step; since ALG4 found an optimized path, thus the node information is included in the SDP response, which information includes the media resource information and the sequence number of the node which can be directly linked thereto in the SDP response (in this example, the sequence number is 1); and ALG4 forwards the SDP response, which SDP response arrives at ALG3;

Step 711: ALG3 checks whether there is node information corresponding to ALG3 in the response, and in this example, the node information includes ALG3 itself (which is determined according to the sequence number, and the sequence number of 1 indicates that the node information is added by ALG3), thus ALG3 replaces the connection information of the corresponding media in the SDP response with the connection information in the node information (i.e. the media connection information of UE2) and forwards the SDP response after deleting the node information in the SDP response; and since the node information is included in the received SDP response, TrGW3 can be bypassed, thus ALG3 releases the resource of TrGW3, and the SDP response arrives at ALG2;

Step 712: ALG2 uses TrGW2 to establish media connection according to a standard process and forwards the SDP response, which SDP response arrives at ALG1; and Step 713: ALG1 checks whether there is node information of itself in the response, and in this example, there is no node information in this step, thus it replaces the media resource information in the SDP response with the media resource information for forward connection of TrGW1, and then forwards the SDP response, which SDP response arrives at UE1.

Till now, an optimized media path is established, which media path is: UE1, TrGW1, TrGW2, and UE2.

Embodiment II

Figure 8:
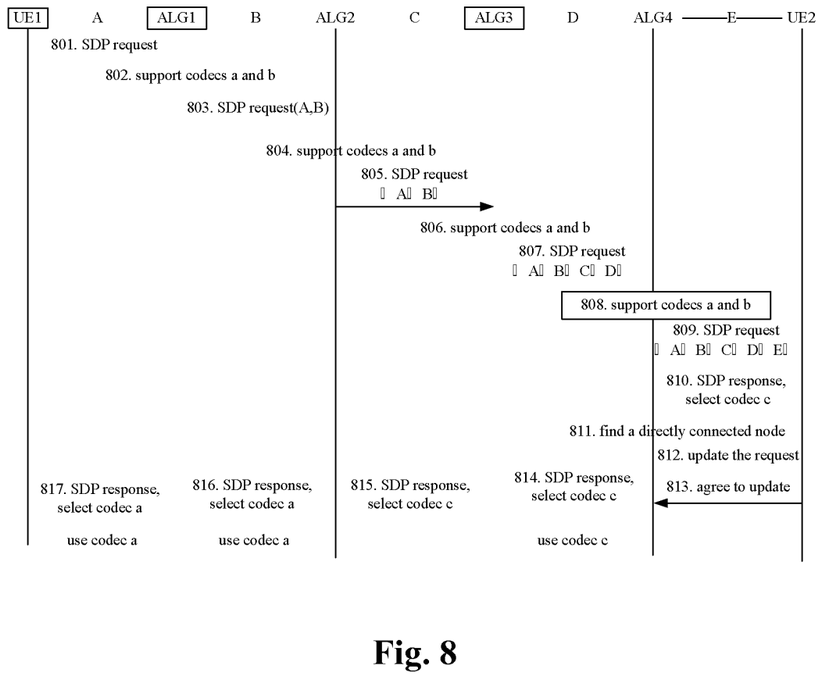
FIG. 8 is a flow chart of embodiment II of the present invention.

FIG. 8 is a flow chart of an embodiment of the present invention corresponding to FIG. 6 and it mainly includes the following steps:

Step 801: UE1 sends an SDP request to UE2 to negotiate the media resource information, for example, by way of sending a call signaling of SIP, i.e. an INVITE request, the message body of this SIP request including this SDP request, and the content of the SDP request is the media resource information of UE1;

Steps 802 to 803: The SDP request arrives at the signaling gateway ALG1, and ALG1 selects TrGW1 as a media gateway; ALG1 controls the media gateway to use the media resource information in the SDP request and allocates the media resource for backward connection; ALG1 replaces the media resource information in the SDP request with the media resource information for backward connection of TrGW1; ALG1 checks whether the connection information in the last accessible domain in the node information recorded in the SDP request is the same as that in the SDP request, and in this example, there is no node information, then it forwards the SDP request after adding the node information controlled by ALG1 to the SDP request, which node information includes the forward accessible domain information and backward accessible domain information of TrGW1, with the forward accessible domain including the connection information, the domain name information, the codec information (a and b), etc. of the corresponding media in the SDP (i.e. the media connection information of UE1) and the backward accessible domain information including the media connection information, domain name of TrGW1, etc.; and the SDP request can be forwarded, for example, by way of transferring an SIP signaling which carries the SDP request;

Steps 804 to 805: The SDP request arrives at the signaling gateway ALG2, and ALG2 does not support optimization algorithm and forwards the SDP request according to a standard process; and ALG2 also supports codec c, therefore codec c is included in the forwarded SDP request.

Steps 806 to 807: The SDP request arrives at the signaling gateway ALG3, and ALG3 selects TrGW3 as a media gateway; ALG3 controls TrGW3 to use the media resource information in the SDP request and allocates the media resource to TrGW3 for backward connection; ALG3 replaces the media resource information in the SDP request with the media resource information for backward connection of TrGW3; ALG3 checks whether the connection information in the last accessible domain in the node information recorded in the SDP request is the same as that in the SDP request, and in this example, they are different (the last node information contains the backward connection information of TrGW1, and the SDP request contains the backward connection information of TrGW2), then it forwards the SDP request after adding the node information controlled by ALG3 to the SDP request, which node information includes the forward accessible domain information and backward accessible domain information of TrGW3, with the forward accessible domain information including the connection information, the domain name information, codec information (codecs a, b, and c), etc. of the corresponding media in the SDP request (i.e. the media connection information of TrGW2) and the backward accessible domain information including the connection information, domain name of TrGW3, etc.; and it forwards the SDP request, for example, by way of transferring an SIP signaling which includes the SDP request;

Steps 808 to 809: The SDP request arrives at the signaling gateway ALG4, and ALG4 selects TrGW4 as a media gateway; ALG4 controls TrGW4 to use the media resource information in the SDP request and allocates the media resource to TrGW4 for backward connection; ALG4 replaces the media resource information in the SDP request with the media resource information for backward connection of TrGW4; ALG4 checks whether the connection information in the last accessible domain in the node information recorded in the SDP request is the same as that in the SDP request, and in this example, they are the same, then it forwards the SDP request after adding the node information controlled by ALG4 to the SDP request, which node information includes the backward accessible domain information of TrGW4, with the backward accessible domain information including the connection information, domain name, etc. of TrGW4; and it forwards the SDP request, for example, by way of transferring an SIP signaling which carries the SDP request;

Step 810: The SDP request arrives at UE2, and UE2 uses the media resource information in the SDP request, selects to use codec c, and sends an SDP response including the media resource information of UE2, for example, by a "200 OK" reply of an SIP signaling, the message body of this SIP reply including this SDP response, and the SDP response arrives at ALG4;

Step 811: ALG4 checks whether there is a node which can be directly linked thereto in the node information recorded in the SDP request, and in this example, TrGW4 can be directly backward-linked to TrGW2;

Steps 812 to 813: ALG4 sends an updating message to UE2 to update the media connection information, in which the SDP request is included, wherein the media connection information is the media connection information in the node which is found, i.e. the backward media connection information of TrGW2, and UE2 sends an updating approval message that includes an SDP response;

Step 814: ALG4 receives the updating approval message, and since ALG4 found an optimized path, thus the node information is included in the SDP response, which information includes the media resource information and the sequence number of the node which can be directly linked thereto (in this example, the sequence number is 3); and ALG4 forwards the SDP response, which SDP response arrives at ALG3;

Step 815: ALG3 checks whether there is node information of itself in the response, and in this example, the node information includes ALG3 (which is determined according to the sequence number, the sequence number being 3 indicates that the node information is added by ALG3), then ALG3 replaces the connection information of the corresponding media in the SDP response with the connection information in the node information (i.e. the media connection information of UE2) and forwards the SDP response after deleting the node information in the SDP response; and since the node information is included in the received SDP response, TrGW3 can be bypassed, thus ALG3 releases the resource of TrGW3, and the SDP response arrives at ALG2;

Step 816: ALG2 uses TrGW2 to establish media connection according to a standard process and forwards the SDP response, which SDP response arrives at ALG1; and Step 817: ALG1 checks whether there is node information of itself in the response, and in this example, there is no node information in this step, thus it replaces the media resource information in the SDP response with the media resource information for forward connection of TrGW1, and then forwards the SDP response, which SDP response arrives at UE1;

Till now, an optimized media path is established, which media path is: UE1, TrGW1, TrGW2, and UE2.

It can be seen from the above description that in the embodiments of the present invention, by way of both adding the forward accessible domain information and adding the backward accessible domain information to the SDP request, the ALG which receives the SDP can determine whether there is an ALG which does not support optimization algorithm by checking whether the media connection information used by the SDP request is the same as the media connection information in the last accessible domain information in the node information in the SDP request. Moreover, in the embodiments of the present invention, the problems can be solved in the prior art by performing corresponding process to the SDP request according to the determination result to avoid the ALG which does not support optimization algorithm from being bypassed in the media path optimization process, which ensures the optimized media path and normal communication and is easy to achieve.

Apparently, those skilled in the art should understand that the above modules and steps of the present invention can be achieved by using general purpose calculating device, can be integrated in one calculating device or distributed on a network which consists of a plurality of calculating devices; Alternatively, the modules and the steps of the present invention can be realized by using the executable program code of the calculating device, and thereby they can be stored in the storing device and executed by the calculating device, and in some cases, the steps shown or described can be carried out in a different order, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for processing a session description protocol (SDP) request in a media path optimization process, comprising:
   an application layer gateway (ALG) receiving a SDP request;
   the ALG determining that media connection information used by the SDP request is different from media connection information in last accessible domain information in node information of the SDP request; and
   the ALG sequentially adding its forward accessible domain information and its backward accessible domain information to an end of a queue of the node information of the SDP request, and then sending the SDP request.

2. The method according to claim 1, after the ALG determines that the media connection information used by the SDP request is different from the media connection information in the last accessible domain information in the node information of the SDP request and before the ALG sequentially adds its forward accessible domain information and its backward accessible domain information to the end of the queue of the node information of the SDP request, further comprising: the ALG deleting all accessible domain information in the node information of the SDP request.

3. The method according to claim 1, wherein the forward accessible domain information added to the SDP request by the ALG further includes: codec information in the SDP request.

4. The method according to claim 1, further comprising:
   if the ALG determines that the media connection information used by the SDP request is the same as the media connection information in the last accessible domain information of the SDP request or if the ALG receives an SDP response of the SDP request, the ALG determining whether there is an optimized media path by way of checking whether there is an accessible domain which is directly linked to a forward accessible domain or a backward accessible domain of the ALG in an accessible domain which corresponds to the accessible domain information recorded by the node information.

5. The method according to claim 1, further comprising:
   the ALG determining that the media connection information used by the SDP request is the same as the media connection information in the last accessible domain information recorded by the node information of the SDP request; and
   the ALG adding its backward accessible domain information to the end of the queue of the node information of the SDP request.

6. The method according to claim 1, wherein the ALG determining that the media connection information used by the SDP request is different from the media connection information in the last accessible domain information in the node information of the SDP request further comprises:
   the ALG checking whether there is node information in the SDP request, if not, then determining that the media connection information used by the SDP request is different from the media connection information in the last accessible domain information recorded by the node information of the SDP request; otherwise
   the ALG checking whether the media connection information used by the SDP request is the same as the media connection information in the last accessible domain information recorded by the node information of the SDP request.

7. The method according to claim 1, wherein the forward accessible domain information and the backward accessible domain information both include: connection information and domain name information.

8. An application layer gateway (ALG), comprising:
   a receiving device configured for receiving a session description protocol (SDP) request;
   a determination device configured for determining whether media connection information used by the SDP request is different from media connection information in last accessible domain information recorded by node information of the SDP request;
   an add device configured for sequentially adding forward accessible domain information of the ALG and backward accessible domain information of the ALG to an end of a queue of the node information of the SDP request in response to a positive result from the determination device, and for adding the backward accessible domain information of the ALG to the end of the queue of the node information of the SDP request in response to a negative result from the determination device; and
   a sending device configured for sending the SDP request which has been processed by the add device.

9. The ALG according to claim 8, further comprising:
   a delete device configured for, before the add device adds node information to the node information of the SDP request, deleting all accessible domain information recorded by the node information of the SDP request in response to a positive result from the determination device.

10. The ALG according to claim 8, wherein the add device is further configured for adding codec information from the SDP request to the forward accessible domain information in response to a positive result from the determination device.

11. The method according to claim 2, further comprising:
if the ALG determines that the media connection information used by the SDP request is the same as the media connection information in the last accessible domain information of the SDP request or if the ALG receives an SDP response of the SDP request, the ALG determining whether there is an optimized media path by way of checking whether there is an accessible domain which is directly linked to a forward accessible domain or a backward accessible domain of the ALG in an accessible domain which corresponds to the accessible domain information recorded by the node information.

12. The method according to claim 2, further comprising:
the ALG determining that the media connection information used by the SDP request is the same as the media connection information in the last accessible domain information recorded by the node information of the SDP request; and
the ALG adding its backward accessible domain information to the end of the queue of the node information of the SDP request.

13. The method according to claim 2, wherein the ALG determining that the media connection information used by the SDP request is different from the media connection information in the last accessible domain information in the node information of the SDP request further comprises:
the ALG checking whether there is node information in the SDP request, if not, then determining that the media connection information used by the SDP request is different from the media connection information in the last accessible domain information recorded by the node information of the SDP request; otherwise
the ALG checking whether the media connection information used by the SDP request is the same as the media connection information in the last accessible domain information recorded by the node information of the SDP request.

14. The method according to claim 2, wherein the forward accessible domain information and the backward accessible domain information both include: connection information and domain name information.

15. The method according to claim 3, further comprising:
if the ALG determines that the media connection information used by the SDP request is the same as the media connection information in the last accessible domain information of the SDP request or if the ALG receives an SDP response of the SDP request, the ALG determining whether there is an optimized media path by way of checking whether there is an accessible domain which is directly linked to a forward accessible domain or a backward accessible domain of the ALG in an accessible domain which corresponds to the accessible domain information recorded by the node information.

16. The method according to claim 3, further comprising:
the ALG determining that the media connection information used by the SDP request is the same as the media connection information in the last accessible domain information recorded by the node information of the SDP request; and
the ALG adding its backward accessible domain information to the end of the queue of the node information of the SDP request.

17. The method according to claim 3, wherein the ALG determining that the media connection information used by the SDP request is different from the media connection information in the last accessible domain information in the node information of the SDP request further comprises:
the ALG checking whether there is node information in the SDP request, if not, then determining that the media connection information used by the SDP request is different from the media connection information in the last accessible domain information recorded by the node information of the SDP request; otherwise
the ALG checking whether the media connection information used by the SDP request is the same as the media connection information in the last accessible domain information recorded by the node information of the SDP request.

18. The method according to claim 3, wherein the forward accessible domain information and the backward accessible domain information both include: connection information and domain name information.

* * * * *